United States Patent
Yun et al.

(10) Patent No.: US 9,503,891 B2
(45) Date of Patent: Nov. 22, 2016

(54) AUTHENTICATION METHOD OF WIRELESS MESH NETWORK

(71) Applicant: Electronics and Telecommunications Research Institute, Daejeon (KR)

(72) Inventors: Mi Young Yun, Daejeon (KR); Anseok Lee, Daejeon (KR); Kwang Jae Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 264 days.

(21) Appl. No.: 13/937,714

(22) Filed: Jul. 9, 2013

(65) Prior Publication Data

US 2014/0013117 A1 Jan. 9, 2014

(30) Foreign Application Priority Data

Jul. 9, 2012 (KR) .................. 10-2012-0074513

(51) Int. Cl.
*H04W 12/06* (2009.01)
*H04W 12/04* (2009.01)
*H04L 29/06* (2006.01)
*H04W 84/18* (2009.01)

(52) U.S. Cl.
CPC ............ *H04W 12/04* (2013.01); *H04W 12/06* (2013.01); *H04L 63/0823* (2013.01); *H04W 84/18* (2013.01)

(58) Field of Classification Search
CPC ................. H04W 12/06; H04W 12/00; H04W 84/18; H04W 40/24; H04L 63/08; H04L 63/0869; H04L 63/20
USPC .......................................... 713/171
See application file for complete search history.

(56) References Cited

U.S. PATENT DOCUMENTS

| | | | | |
|---|---|---|---|---|
| 2004/0015689 | A1* | 1/2004 | Billhartz | H04L 63/061 713/156 |
| 2004/0064741 | A1* | 4/2004 | Haverinen | H04L 29/06 726/3 |
| 2005/0215234 | A1* | 9/2005 | Fukuzawa | H04M 3/38 455/411 |
| 2007/0099597 | A1* | 5/2007 | Arkko | H04L 9/3236 455/411 |

(Continued)

FOREIGN PATENT DOCUMENTS

KR 10-2008-0029213 4/2008

*Primary Examiner* — Brian Shaw
(74) *Attorney, Agent, or Firm* — Nelson Mullins Riley & Scarborough LLP; Anthony A. Laurentano

(57) ABSTRACT

Disclosed is an authentication method of a wireless mesh network capable of reducing overload and communication delay during authentication procedure by performing authentication between nodes without accessing an authentication server. The authentication method of a wireless mesh network according to an exemplary embodiment of the present disclosure includes: selecting, by a new node, a first neighbor node among one or more adjacent nodes; transmitting, by the new node, an authentication request message including a public key of the new node; authenticating, by the first neighbor node, the public key of the new node; transmitting, by the first neighbor node, an authentication response message including a public key of the first neighbor node to the new node; and authenticating, by the new node, the public key of the first neighbor node; transmitting, by the new node, an authentication identification message to the first neighbor node.

5 Claims, 5 Drawing Sheets

(56) References Cited

U.S. PATENT DOCUMENTS

| | | | |
|---|---|---|---|
| 2010/0023768 A1* | 1/2010 | Lin | H04W 12/06 713/171 |
| 2010/0228980 A1 | 9/2010 | Falk et al. | |
| 2011/0205956 A1* | 8/2011 | Inada | H04W 84/12 370/315 |

* cited by examiner

AUTHENTICATION METHOD OF WIRELESS MESH NETWORK

CROSS-REFERENCE TO RELATED APPLICATIONS

This application is based on and claims priority from Korean Patent Application No. 10-2012-0074513, filed on Jul. 9, 2012, with the Korean Intellectual Property Office, the disclosure of which is incorporated herein in its entirety by reference.

TECHNICAL FIELD

The present disclosure relates to an inter-node authentication method based on a public key infrastructure in a wireless mesh network.

BACKGROUND

A wireless mesh network has architecture in which a plurality of movable wireless nodes is connected in a mesh form. A node of the wireless mesh network, which is a node configuring a mesh network, may perform inter-node communication. Each node has a function of transmitting or relaying data for inter-node communication and needs to have a function of setting a path for multi hop transmission. The mesh network has architecture in which all the nodes are locally connected or may be operated in architecture in which all the nodes are locally separated. Mesh nodes operated by being connected with each other in each network are referred to as a mesh group. The mesh group may be dynamically separated or merged by the mesh nodes having mobility.

Since the wireless mesh network can implement multi hop transmission, communication cannot be made due to a malicious node transmitting wrong information or wireless data transmission between the mesh nodes can be monitored. Therefore, authentication of each node and encryption of data transmitted and received between nodes are essentially required.

In the wireless mesh network according to the related art, as an authentication method between the nodes, a central authentication method using an authentication server has been mainly used.

In the central authentication method, the authentication server having information on all the nodes within the mesh network are present and there is a need to access the authentication server each time the node is authenticated. When an authentication requesting node is not directly connected with the authentication server, intermediate nodes relay between the authentication requesting node and the authentication server to perform an authentication procedure. Therefore, when several nodes simultaneously request authentication, an overload may occur in a path to the authentication server and a lot of delay may occur during the authentication procedure.

Even though the load impedance is matched with the impedance of a circuit to which the plurality of sources is connected, the load impedance is not matched with each source, such that the available electric power of each source is not used maximally.

SUMMARY

The present disclosure has been made in an effort to provide an authentication method of a wireless mesh network capable of reducing overload and communication delay during authentication procedure by performing authentication between nodes without accessing an authentication server.

An exemplary embodiment of the present disclosure provides an authentication method of a wireless mesh network including: selecting, by a new node, a first neighbor node among one or more adjacent nodes; transmitting, by the new node, an authentication request message including a public key of the new node; authenticating, by the first neighbor node, the public key of the new node; transmitting, by the first neighbor node, an authentication response message including a public key of the first neighbor node to the new node; and authenticating, by the new node, the public key of the first neighbor node; transmitting, by the new node, an authentication identification message to the first neighbor node.

The new node and the first neighbor node may share a secret key for inter-node traffic encryption through an authentication procedure.

The authentication method of a wireless mesh network may further include: transmitting, by the new node, a session key request message generated by combining the secret key with a first random value to the first neighbor node; and transmitting, by the first neighbor node, a session key response message generated by combining the session key request message with a second random value to the new node, wherein the new node and the first neighbor node uses a session key generated by combining the secret key with the first and second random values for the inter-node traffic encryption.

Another exemplary embodiment of the present disclosure provides an authentication method of a wireless mesh network including: performing, by a new node, an authentication procedure with a first neighbor node among a plurality of neighbor nodes; transmitting, by the new node, a neighbor node authentication request message for one or more other neighbor nodes having security connection with the first neighbor node among the plurality of neighbor nodes to the first neighbor node; transmitting, by the first neighbor node, the neighbor node authentication request message to one or more other neighbor nodes; transmitting, by one or more other neighbor nodes, a neighbor node authentication response message for the new node to the first neighbor node; transmitting, by the first neighbor node, the neighbor node authentication response message to the new node; transmitting, by the new node, a neighbor node authentication identification message for one or more other neighbor nodes to the first neighbor node; and transmitting, by the first neighbor node, the neighbor node authentication identification message to one or more other neighbor nodes.

When one or more other neighbor nodes are in plural, the neighbor node authentication response message and the neighbor node authentication identification message transmitted between the new node and the first neighbor node may be integrated with authenticated results between the new node and one or more other neighbor nodes so as to be transmitted as a single message.

The performing of the authentication procedure with the first neighbor node by the new node may include: selecting, by the new node, the first neighbor node among one or more adjacent nodes; transmitting, by the new node, an authentication request message including a public key of the new node; authenticating, by the first neighbor node, the public key of the new node; transmitting, by the first neighbor node, an authentication response message including a public key of the first neighbor node to the new node; and authenticating, by the new node, the public key of the first neighbor node; transmitting, by the new node, an authentication identification message to the first neighbor node.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Figure 1:
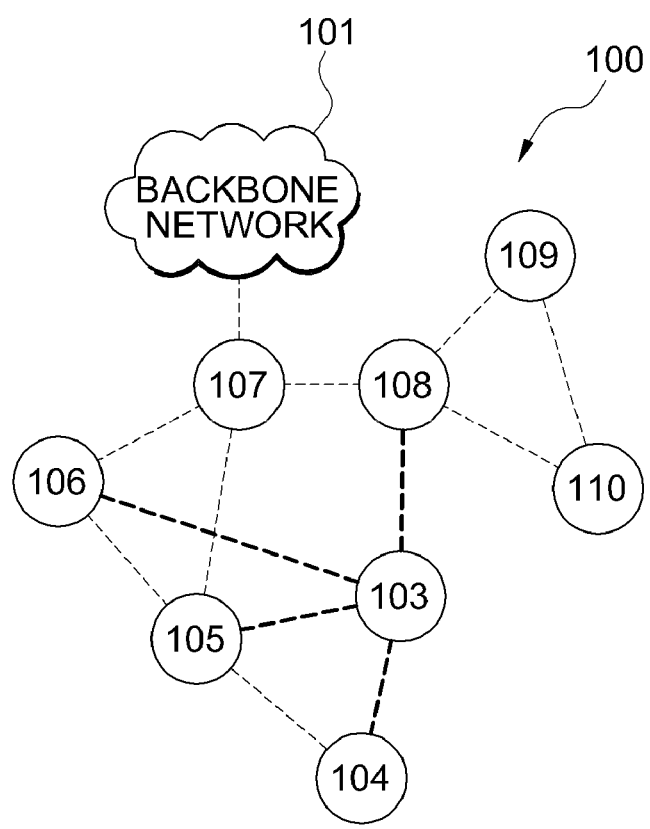
FIG. 1 is a diagram showing architecture of a wireless mesh network according to an exemplary embodiment of the present disclosure.
Figure 2:
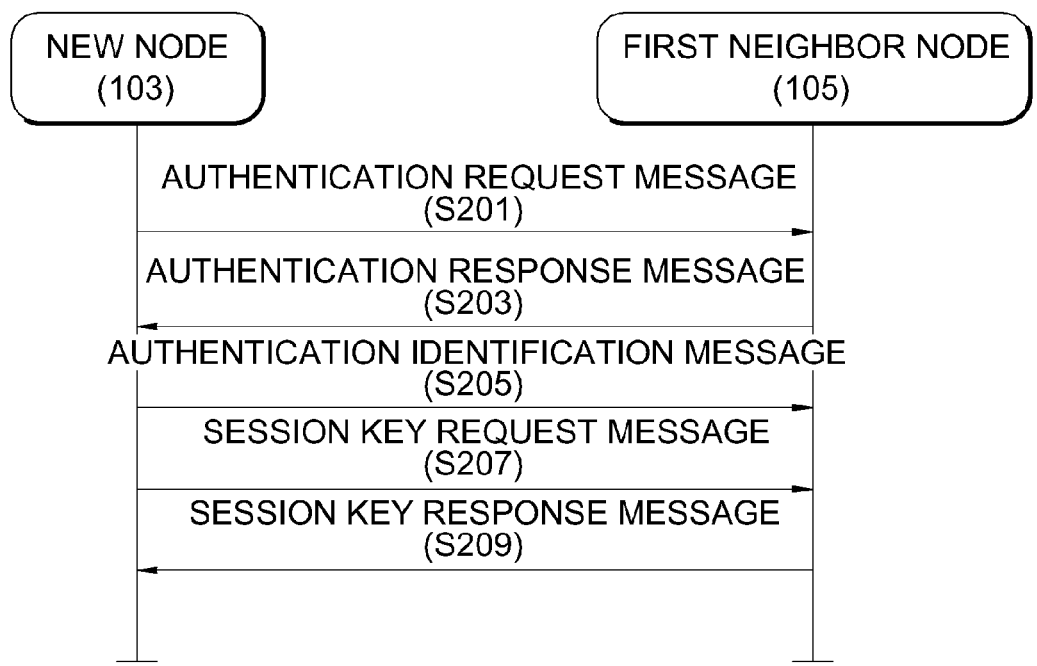
FIG. 2 is a diagram for describing an authentication method of a wireless mesh network according to an exemplary embodiment of the present disclosure.

FIG. 1 is a diagram showing architecture of a wireless mesh network according to an exemplary embodiment of the present disclosure and FIG. 2 is a diagram for describing an authentication method of a wireless mesh network according to an exemplary embodiment of the present disclosure.

Referring to FIG. 1, a wireless mesh network 100 includes a backbone network 101 including an authentication server (not shown) and a plurality of nodes 103 to 110.

Each node 103 to 110 has a data transmission function for inter-node communication, a relay function, and a path setting function for multi hop transmission. The network may be operated in a structure in which all the nodes are connected or a structure in which all the nodes are locally separated. In this case, nodes operated by being connected with each other are referred to as a mesh group. A mesh group may be dynamically separated or merged by nodes having mobility. As shown, the mesh network may be connected to the backbone network 101 and may be independently operated.

In FIG. 1, when a new node 103 is newly added, a node with which the new node 130 may directly communicate is neighbor nodes 104, 105, 106, and 108 and may communicate with nodes 106, 109, and 110 using a relay function of the neighbor nodes 105, 106, and 108. The node may share inter-node secret keys with each neighbor node by an authentication procedure and a key distribution algorithm. The shared secret keys may also be the same according to an authentication and encryption policy of a network and may be different for each node pair. It is possible to secure privacy and integrity between two nodes by the shared secret keys.

In the exemplary embodiment of the present disclosure, a distributed authentication method based on a public key is used for inter-node authentication. In the distributed authentication method based on the public key, all the nodes are issued a certificate from the authentication server prior to participating in communication. The certificate includes various types of information including the public key of the corresponding node and the public key is digitally signed with the secret key of the authentication server. All the nodes know the public key of the authentication server.

Since the neighbor nodes may be changed due to on/off and mobile characteristics of a power supply, each node may know information on new neighbor nodes by receiving the neighbor node information periodically (or aperiodically) transmitted. When one node finds new neighbor nodes, an inter-node connection setting procedure may start. When a plurality of neighbor nodes is found, a connection setting procedure with a neighbor node having the largest received signal or the first found neighbor node may start. The connection setting procedure may include the inter-node authentication procedure. The authentication procedure will be described with reference to FIG. 2.

Referring to FIGS. 1 and 2, an authentication method of the wireless mesh network 100 according to an exemplary embodiment of the present disclosure includes selecting, by the new node 103, the first neighbor node 105 among one or more neighbor nodes to transmit an authentication request message including the public key of the new node 103 (S201), authenticating, by the first neighbor node 105 receiving the authentication request message, the public key of the new node 103 to transmit an authentication response message including the public key of the first neighbor node 105 to the new node 103 (S203), and authenticating, by the new node 130 receiving the authentication response message, the public key of the first neighbor node 105 to transmit an authentication identification message to the first neighbor node 105 (S205).

In S201, the authentication request message may include a transmitting node/receiving node identifier, a certificate including the public key of the new node 103, an electronic signature algorithm used for the certificate, authentication security capability (encryption algorithm, and the like), and the like.

In S203, the first neighbor node 105 receiving the authentication request message uses the public key of the authentication server to authenticate the public key of the new node 103 and transmit the authentication response message to the new node 103. The authentication response message may include the transmitting node/receiving node identifier, authenticated results of the certificate of the new node 103, response to the authentication security capability, a certificate including the public key of the first neighbor node 105, an electronic signature algorithm used for the certificate, and the like. In this case, when the inter-node traffic encryption and the key distribution necessary for data transmission and reception are required, a secret key may be generated and transmitted together being encrypted with the public key of the new node 103.

In S205, the new node 103 receiving the authentication response message authenticates the public key of the first neighbor node 105 and transmits the corresponding results to the first neighbor node 105 through the authentication identification message.

The new node 103 and the first neighbor node 105 may share the secret key for the inter-node traffic encryption through the foregoing authentication procedures S201 to S205. In this case, the corresponding secret key may also be used as it is, but in order to more improve security, a session key may also be generated using the secret key as a master key.

When the session key is generated, the authentication method according to the exemplary embodiment of the present disclosure may further include transmitting, by the new node 103, a session key request message generated by combining the secret key for traffic encryption with a first random value to the first neighbor node 105 (S207) and transmitting, by the first neighbor node 105, a session key response message generated by combining the session key request message with a second random value to the new node 103 (S209). Therefore, the new node 103 and the first neighbor node 105 may use the session key generated by combining the secret key with the first and second random values for the inter-node traffic encryption and may vary the first and second random values to use different session keys for each traffic session. It is determined whether the session key setting procedures (S207 and S209) are performed according to the security policy of the wireless mesh network 100.

Meanwhile, the authentication method as shown in FIG. 2 may repeatedly perform between the new node 103 and the neighbor nodes 104, 105, 106, and 108 one-to-one. In this case, however, the neighbor nodes may be frequently changed due to the mobility of the node and therefore, when a large number of neighbor nodes performing a new authentication procedure are present, much time to confirm the certificate and perform the encryption/decryption procedure of the public key may be consumed. In the following exemplary embodiments, a method for reducing the time consumed to authenticate the mesh node having the plurality of neighbor nodes is proposed.

Figure 3:
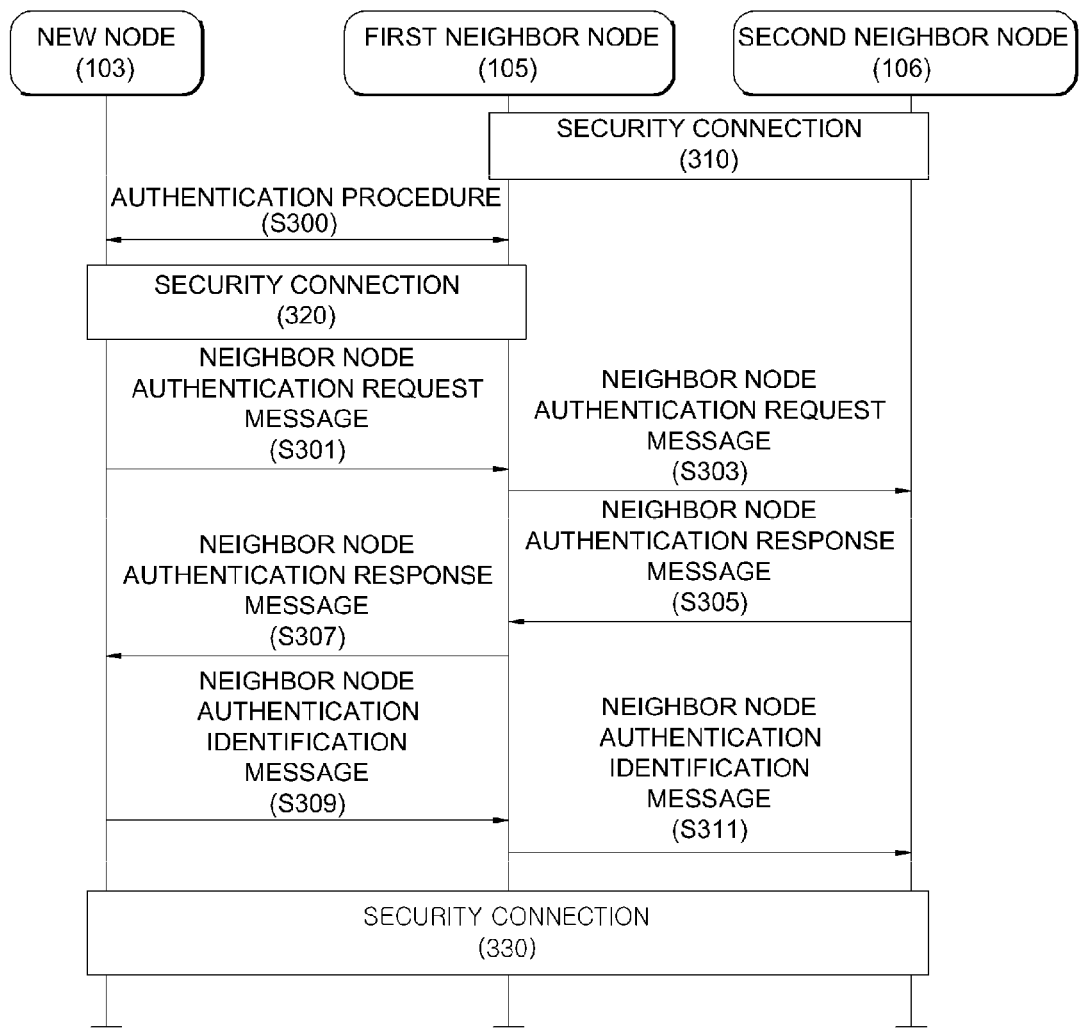
FIG. 3 is a diagram for describing an authentication method of a wireless mesh network according to another exemplary embodiment of the present disclosure.

FIG. 3 is a diagram for describing an authentication method of a wireless mesh network according to another exemplary embodiment of the present disclosure.

Referring to FIGS. 1 and 3, the authentication method of the wireless mesh network 100 according to another exemplary embodiment of the present disclosure includes performing, by the new node 103, the authentication procedure with the first authentication node 105 among the plurality of neighbor nodes (S300), transmitting, by the new node 103, a neighbor node authentication request message of the second neighbor node 106 having security connection with the first authentication node 105 among the plurality of neighbor nodes to the first neighbor node 105 (S301), transmitting, by the first neighbor node 105, the neighbor node authentication request message to the second neighbor node 106 (S303), transmitting, by the second neighbor node 106, the neighbor node authentication response message of the new node 103 to the first neighbor node 105 (S305), transmitting, by the first neighbor node 103, the neighbor node authentication response message to the new node 103 (S307), transmitting, by the new node 103, the neighbor node authentication identification message of the second neighbor node 106 to the first neighbor node (S309), and transmitting, by the first neighbor node 105, the neighbor node authentication identification message to the second neighbor node 106 (S311).

In the exemplary embodiment of the present disclosure, the new node 103 performs the authentication procedure with a representative node among the plurality of neighbor nodes, that is, the first neighbor node 105 and transmits the information on the new node 103 to another neighbor node, that is, the second neighbor node 106 having security connection 310 with the first neighbor node 105 via the first neighbor node 105, thereby reducing the time consumed to authenticate the plurality of neighbor nodes.

In S300, when the new node 103 finds the plurality of neighbor nodes, the new node 103 selects the first neighbor node 105 as the representative node according to a predetermined reference and performs authentication procedures S201 to S205 or S201 to S209 of FIG. 2 with the first neighbor node 105. When the authentication procedures are completed, data are encrypted using the shared secret key or session key between the two nodes 103 and 105 to secure privacy and has security connection 320 securing data integrity using a message authentication code. In this case, it is assumed that the first neighbor node 105 and the second neighbor node 106 complete the connection procedure prior to S300 to set the security connection 310.

Next, the authentication procedures with the second neighbor node 106 that is the neighbor node of the new node 103 and has the security connection 310 with the first neighbor node 105 are performed.

In S301 and S303, the new node 103 transmits the neighbor node authentication request message to the first neighbor node 105 and the first neighbor node 105 transmits the neighbor node authentication request message to the second neighbor node 106. The neighbor node authentication request message may include the transmitting node/receiving node identifier, the public key, the authentication security capability, and the like, of the new node 103.

In S305 and S307, the second neighbor node 106 receiving the neighbor node authentication request message authenticates the public key of the new node 103 and transmits the neighbor node authentication response message including the transmitting node/receiving node identifier, the public key of the second neighbor node 106, the response to the authentication security capability, and the like, to the first neighbor node 105. The first neighbor node 105 again transmits the neighbor node authentication response message to the new node 103. In this case, when the inter-node traffic encryption and the key distribution necessary for data transmission and reception are required, they both may be transmitted by generating the secret key and being encrypted with the public key of the new node 103.

In S309 and S311, the new node 103 receiving the authentication response message authenticates the public key of the second neighbor node 106 and transmits the neighbor node authentication identification message including the corresponding results to the first neighbor node 105. The first neighbor node 105 again transmits the neighbor node authentication identification message to the second neighbor node 106. Therefore, the security connection 330 is also set between the new node 103 and the second neighbor node 106.

Next, when the session key setting procedure is required between the new node 103 and the second neighbor node 106, the method such as S207 and S209 of FIG. 2 may be used.

In the exemplary embodiment of the present disclosure, when there are the plurality of neighbor nodes having the security connection with the first neighbor node 105 among the neighbor nodes of the new node 103 like the nodes 104, 106, and 107 of FIG. 1, the neighbor node authentication request message transmitted to the first neighbor node 105 by the new node 103 at the time of the authentication procedures with the neighbor nodes may include information on the plurality of other neighbor nodes and the representative node 105 receiving the neighbor node authentication request message may transmit and receive the authentication request message and the authentication response message to and from the plurality of other neighbor nodes. In this case, the neighbor node authentication response message and the neighbor node authentication identification message transmitted and received between the first neighbor node 105 and the new node 103 are integrated with the authenticated results of the plurality of other neighbor nodes so as to be transmitted as a single message. As a result, it is possible to largely reduce the network overload and the communication delay that are generated during the authentication procedures of the wireless mesh network.

Figure 4:
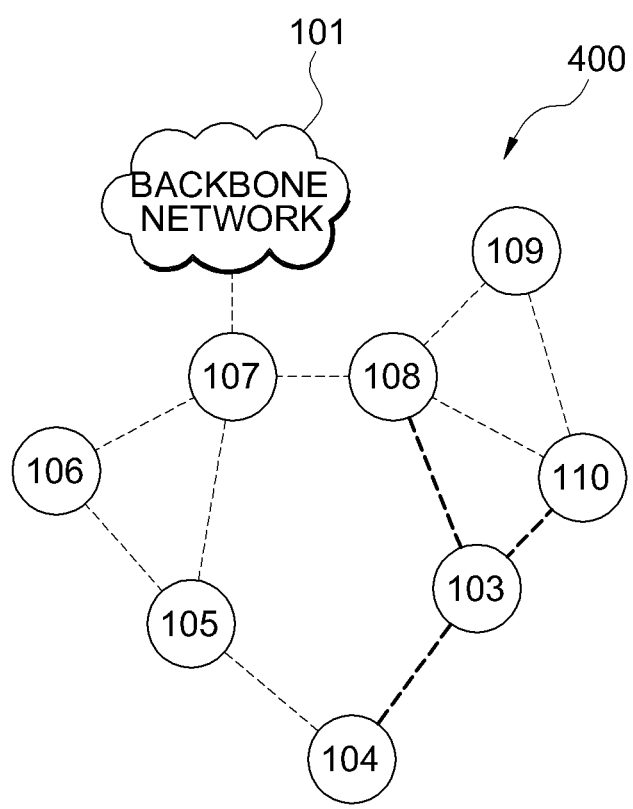
FIGS. 4 and 5 are diagrams for describing an authentication method according to another exemplary embodiment of the present disclosure when new neighbor nodes are generated due to a movement of a new node in the wireless mesh network of FIG. 1.
Figure 5:
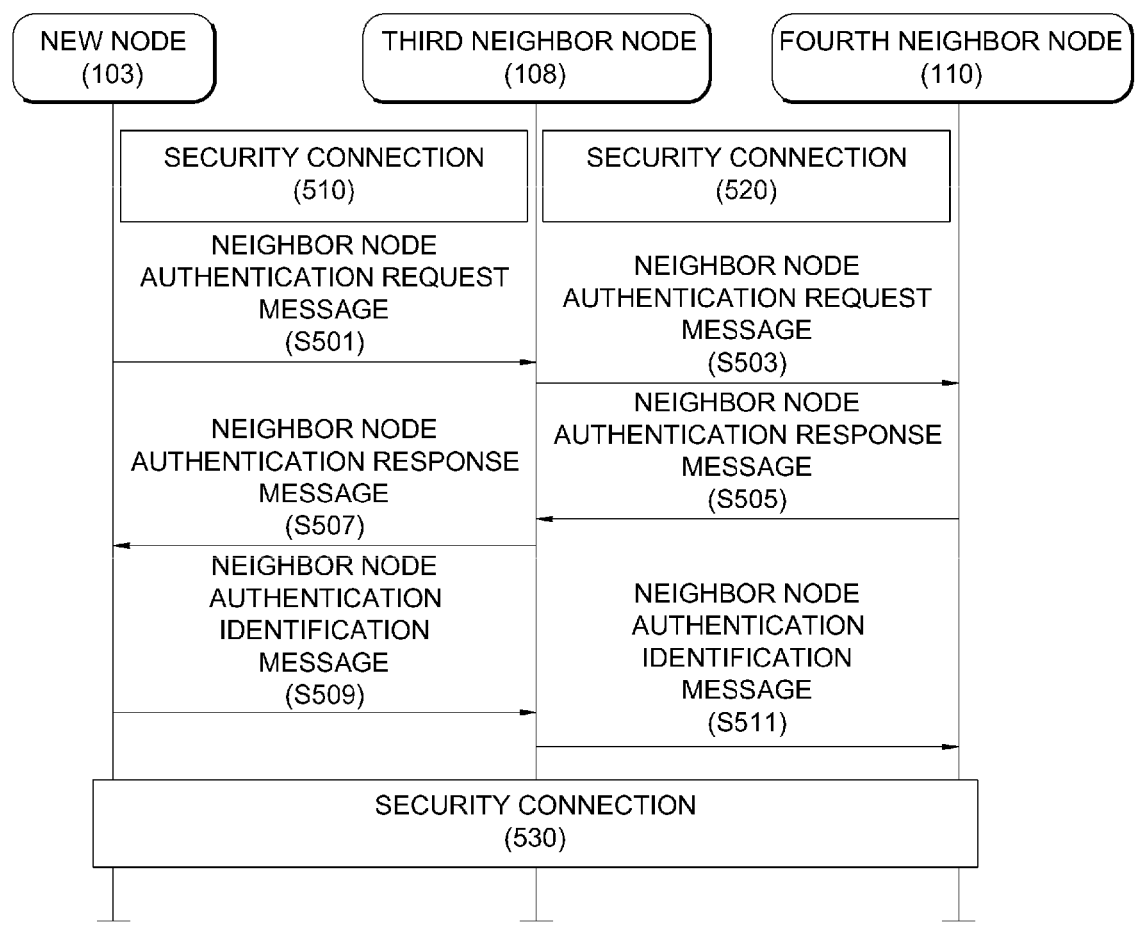

FIGS. 4 and 5 are diagrams for describing an authentication method according to another exemplary embodiment of the present disclosure when new neighboring nodes are generated due to a movement of a new node in the wireless mesh network of FIG. 1.

As shown in FIGS. 4 and 5, it is assumed that the new neighbor node (fourth neighbor node) 110 is found by moving the new node 103 in the state of the wireless mesh network of FIG. 1 and the new node 103 already has security connection 510 with the third neighbor node 108 and the third neighbor node 108 already has security connection 520 with the fourth neighbor node 110. In this case, the new node 103 transmits and receives the neighbor node authentication request message (S501 and S503), the neighbor node authentication response message (S505 and S407), and the neighbor node authentication identification message (S509 and S511) to and from the fourth neighbor node 110 via the third neighbor node 108 using the connections 510 and 520 with the third neighbor node 108 by the same method as FIG. 3, thereby more rapidly and efficiently performing the authentication procedures.

According to the exemplary embodiments of the present disclosure, the authentication and the key distribution between the nodes can be performed by the distributed authentication method based on the public key in the wireless mesh network without accessing the authentication server, thereby largely reducing the overload and the communication delay during the authentication procedure.

It is possible to more reduce the time required for authentication by performing the authentication for the new neighbor nodes by using a security connection relation between the previously set nodes at the time of the movement of the nodes.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An authentication method of a wireless mesh network, comprising:
    selecting, by a new node, a first neighbor node among one or more adjacent nodes;
    transmitting, by the new node, an authentication request message including a public key of the new node;
    authenticating, by the first neighbor node, the public key of the new node;
    transmitting, by the first neighbor node, an authentication response message including a public key of the first neighbor node to the new node; and
    authenticating, by the new node, the public key of the first neighbor node;
    transmitting, by the new node, an authentication identification message to the first neighbor node,
    wherein the authentication request message and the authentication response message include a transmitting node identifier, a receiving node identifier, a certificate issued from an authentication server, an electronic signature algorithm used for the certificate, and an encryption algorithm, wherein the certificate includes public keys of each node.

2. The authentication method of claim 1, wherein the new node and the first neighbor node share a secret key for inter-node traffic encryption through an authentication procedure.

3. The authentication method of claim 2, further comprising:
    transmitting, by the new node, a session key request message generated by combining the secret key with a first random value to the first neighbor node; and
    transmitting, by the first neighbor node, a session key response message generated by combining the session key request message with a second random value to the new node,
    wherein the new node and the first neighbor node use a session key generated by combining the secret key with the first and second random values for the inter-node traffic encryption.

4. The authentication method of claim 3, wherein the new node and the first neighbor node use different session keys for each session by varying the first and second random values.

5. The authentication method of claim 1, wherein the new node selects a node having the largest received signal or the first found node among one or more neighbor nodes as the first neighbor node.

* * * * *